US008277098B2

(12) United States Patent
Ortwein et al.

(10) Patent No.: US 8,277,098 B2
(45) Date of Patent: Oct. 2, 2012

(54) BOAT LIGHTING COMPONENTS AND SYSTEM

(75) Inventors: Michael Scot Ortwein, Mitchell, KY (US); Christopher Joseph Nesbitt, Cincinnati, OH (US)

(73) Assignee: Michael Scot Ortwein, Park Hills, KY (US)

( * ) Notice: Subject to any disclaimer, the term of this patent is extended or adjusted under 35 U.S.C. 154(b) by 220 days.

(21) Appl. No.: 12/614,962

(22) Filed: Nov. 9, 2009

(65) Prior Publication Data

US 2010/0118557 A1 May 13, 2010

Related U.S. Application Data

(60) Provisional application No. 61/112,765, filed on Nov. 9, 2008.

(51) Int. Cl.
*B60Q 1/00* (2006.01)
*F21V 1/00* (2006.01)

(52) U.S. Cl. ........................................ 362/477
(58) Field of Classification Search .................... 362/477
See application file for complete search history.

(56) References Cited

U.S. PATENT DOCUMENTS

| 3,955,078 A | 5/1976 | Eggers et al. |
| D299,550 S | 1/1989 | Payne |
| 4,954,931 A | 9/1990 | Hassler, Jr. |
| 5,495,401 A | 2/1996 | Evans |
| 6,474,851 B1 | 11/2002 | Baley |
| 6,733,161 B2 * | 5/2004 | Tufte .............................. 362/505 |
| 7,291,852 B1 | 11/2007 | Matlack et al. |
| 7,425,718 B1 | 9/2008 | Baley et al. |

OTHER PUBLICATIONS

Perimeter Lighting System (http://perimeterlightingsystem.tech.officelive.com/Patent.aspx), identifying a provisional patent application filed Sep. 21, 2007, and a full utility patent application filed Sep. 21, 2008 (unpublished) in the inventor's name Mike Renusch, and the Renusch Perimeter Lighting System (http://www.newproductsnetwork.com/perimeterlightingsystem/) (2 pages) (webpage first accessed Jun. 2009).
Oznium LED Strips (www.oznium.com/led-flex-strips) (5 pages) (Nov. 7, 2007).

* cited by examiner

*Primary Examiner* — Jason Moon Han
(74) *Attorney, Agent, or Firm* — Hasse & Nesbitt LLC; Daniel F. Nesbitt

(57) ABSTRACT

An LED lighting system for watercraft, including LED lighting assemblies inserted into tubular members and inserted within rub rails mounted along the gunwale or wall of the hull, along the starboard and port sides, bow and stern. The LED lighting assembly can include ultraviolet LEDS for night fishing, white-light LEDs, a red LED port-running light, and a green LED starboard-running light. The string of LED lights can be pre-assembled into conventional insert tubing, and inserted into the cavities of the rub rail to emit the desired LED light from within the rub rail.

5 Claims, 11 Drawing Sheets

BOAT LIGHTING COMPONENTS AND SYSTEM

CROSS-REFERENCE TO RELATED APPLICATIONS

This application claims the benefit of U.S. provisional application 61/112,765, filed Nov. 9, 2008, the disclosure of which is incorporated by reference in its entirety.

FIELD OF THE INVENTION

This invention relates to a boat light system, including an ultraviolet fishing lighting system usable for night fishing.

BACKGROUND OF THE INVENTION

It is known to provide a fishing light which is removably mounted to a trunnion mount on the gunwale of a boat wherein one bulb is an elongated "fishing light" connected to a rheostat for changing the brightness while the other light is a dual filament spot light. The filaments of these bulbs are mutually exclusive, that is, only one can be used at any given time. For instance, see the U.S. Pat. No. 3,955,078 issued on May 4, 1976 to Eggers, et al.

It is also known to provide a fishing light mounted to a gunwale of a boat by suction cups. For instance, see the U.S. Design Pat. No. 299,550 issued on Jan. 24, 1989 to Duncan M. Payne. A separate shield mounted to the top of the light is now required to keep the light from shining in the face of fisherpersons using this light.

It is further known to provide a lighting strip mounted in the bumper guard for the boat to provide for the ship's directional lighting. The strips require 250 volts AC power normally not available on a fishing boat thus requiring a separate power source. For instance, see U.S. Pat. No. 4,495,401 issued on Feb. 27, 1996 to Graham P. Evans.

William L. Hassler, Jr., in U.S. Pat. No. 4,954,931 issued Sep. 4, 1990 discloses a light source for producing a relatively uniform dispersed light emission along a length of a light bar, the bar comprising a prism made of polycarbonate having one frosted face and having a light emitting diode lighting source in at least one end thereof.

U.S. Pat. No. 6,474,851 discloses at least one ultraviolet light source, at least one white light source, means for separately controlling the ultraviolet light source and the white light source and a mounting base, the mounting base carrying the ultraviolet light source, the white light source and the means for separately controlling wherein the fishing lighting system is integral with a portion of the gunwale of a boat.

U.S. Pat. No. 7,291,852, issued Nov. 6, 2007, and U.S. Pat. No. 7,425,718, issued Sep. 16, 2008, disclose a lighting system for a fishing boat, having a ultraviolet (UV) light source mounted to a mounting base, mounted upon a portion of the gunwale of the boat. The light source having an array of point light sources, spaced apart at intervals from about ½ inch to about two feet and having a narrow viewing angle of between 5 degrees and 45 degrees. The point light sources can include light emitting diodes (LEDs) mounted on the base having an integrated circuit and an electrical power source associated with the base. The mounted light assembly may be mounted on a side of the boat above, below or within the rub rail of the gunwale.

There remains a need to provide a lighting system for a watercraft such as a motorboat or fishing boat which is easily installed or retrofitted into an existing watercraft, and/or which significantly limits or eliminates damaging of the light sources under normal use of the boat, and/or which provides reduced maintenance and repair, and/or which significantly reduces or eliminates the possibility of glare from the light upon the eyes of the boat's occupants, and/or which does not catch or snag upon the fishing lines, and/or which does not require a separate step of mounting when needed, and/or which requires minimal, modification and retrofitting of new and existing watercraft for its installation.

SUMMARY OF THE INVENTION

The present invention provides a watercraft lighting system that is disposed in a location along the side of the watercraft, which location may be exposed to damage from the watercraft striking or rubbing along a dock or other object, that substantially prevents damage to the light sources and operation of the light sources of the watercraft lighting system. The lighting system is easily installed or retrofitted into an existing watercraft, and significantly limits or eliminates damaging of the light sources under normal use of the boat. The lighting system requires reduced maintenance and repair, and significantly reduces or eliminates the possibility of glare from the light upon the eyes of the boat's occupants, and of catching or snagging of fishing lines. The lighting system is built-in or integral with the hull of the boat, and thus does not require a separate step of mounting when needed, and is readily retrofitted into new and existing watercraft.

An aspect of the invention is a lighting system for watercraft, including: a) an elongated mounting base having a first surface for attachment to the gunwale or side wall surface of a watercraft, and an outer surface having an elongated opening communicating with an elongated cavity within the mounting base, and b) at least one elongated lighting assembly securable within the elongated cavity, the elongated lighting assembly including a string of light emitting diodes (LEDs) spaced along and positioned within the elongated cavity that emit light from within the elongated cavity and through the elongated opening of the elongated mounting base.

Typically the LEDs and the elongated lighting assembly are recessed within the outer surface to minimize or avoid contacting the LEDs and the elongated lighting assembly with outside objects, such as a dock, and to cause the emitted light to be emitted in a band generally away from the watercraft, and away from the eyes of occupants within the water craft.

Another aspect of the invention is a lighting system for watercraft, including: a) an elongated rub rail having a base having an inner surface for attachment to the gunwale or side wall surface of a watercraft, and at least one retaining arm, including a pair of opposed retaining arms, extending from an outer portion or portions of the base, each arm having a distal end wherein the distal ends are spaced apart to define an elongated opening communicating with an elongated cavity formed between the arms, and b) an elongated lighting assembly securable within the elongated cavity of the elongated rub rail, the elongated lighting assembly including an inserted member and a plurality of light emitting diodes (LEDs) spaced along and positioned within the inserted member to emit light through the elongated opening of the elongated rub rail. The inserted member includes a tubular member.

Another aspect of the invention provides an elongated lighting device that can be mounted within a suitably-sized cavity within an insert or a rub rail, including an elongated string of LEDs secured to an insertable body. The insertable body is molded plastic piece having a base portion and a top surface joined around the periphery of the base portion by a sidewall, with the LEDs affixed to or within the base portion. The depth of the LEDs below the top surface, and the slope of the sidewall, cut down the angle of the light emitted outwardly and laterally by the string of LEDs, including over the leading edge of the rim of the sidewall. The elongated lighting devices are useful as port and starboard running lights on motorized watercraft.

The lateral size of the elongated cavity is larger than the width of the elongated opening, to retain the elongated lighting assembly within the cavity.

The tubular member includes a cylindrical tubular wall having an elongated opening, or a plurality of openings, formed through the tubular wall and along the length of the tubular member. The single elongated opening, or the plurality of openings, is aligned on an outwardly facing surface, which when installed faces away from the wall of the watercraft. The tubular member can have other non-circular shapes.

Another aspect of the invention is an LED lighting assembly that includes a tubular member including a tubular wall having an elongated opening, or a plurality of spaced apart openings, through the tubular wall and aligned along the length of the tubular member, and a plurality of light emitting diodes (LEDs) spaced along and positioned within the tubular member that emit light through the elongated opening or plurality of openings.

Another aspect of the invention used in any of the aforementioned aspects is a tubular member that has a cross-sectional shape adaptable for insertion into an elongated strip of rub rail, the shape including cylindrical (circular), elliptical, oval, semi-circular, semi-elliptical, semi-oval, triangular, trapezoidal rectangular, square and other polygons, including such polygons with rounded corners.

Another aspect of the invention used in any of the other aspects and embodiments of the invention, is the plurality of light emitting diodes (LEDs) assembled as a string of spaced apart LEDs, and an elongated encasing material that encloses the string of LEDs. The encasing material is typically a flexible, resilient material that protects the LED, and the wiring and control elements associated with the LEDs, from water and other environmental elements, breakage, shock, and other outside forces such as impacts with objects. The flexible, resilient materials can include silicone or silicon-based material or composite material, and polymeric plastics. Typical the material, at least in the vicinity of the LED and the path of the light emitted from the LED, is transparent or translucent, to allow emitted light to pass there through with sufficient flux to not obstruct the illumination of the environment around and distant from the watercraft. The shape and size in cross section along the length of the encased string of LEDs can be square, rectangular, or other polygon, including such polygons with rounded corners, circular, elliptical, and oval. The portion of the encased string of LEDs surrounding the LEDs themselves and orthogonal to the length of the string of LEDs, can have a variety of shapes oriented around the emitted-light centerline of the LED, including cylindrical, domed, and rectilinear.

Another aspect used in any of the other aspects and embodiments of the invention, is a fishing boat with one or more of the lighting assemblies along either or both the starboard and port sides, and/or at the front or bow, and/or at the rear or stern.

Another aspect used in any of the other aspects and embodiments of the invention, is a plurality of lighting assemblies including LEDS, that can include white-light LEDs at or along the front or bow, sides, or rear or stern, of the watercraft; can include a plurality of green LEDs along the starboard side, typically at the front or bow end; can include a plurality of red LEDs along the port side, typically at the front or bow end; can include a plurality of ultraviolet (UV) LEDs along either or both the starboard and port sides, which are typically used for night fishing by illuminating a fluorescent fishing line.

A further aspect of the invention provides a convenient elongated light assembly with a linear array of LEDs that can be universally installed into any one of numerous styles of rub rail on a watercraft In another aspect of the invention, the individual LEDs in an LED lighting assembly can be positioned with their axes of light emission (nader) oriented parallel to the adjacent and successive LEDs, or can be positioned and secured at an angle relative to the adjacent or successive LEDs, either in the horizontal plane along the rub rail, or in the vertical plane transverse to the rub rail, or at an angle in between. The angling of LEDs can direct or concentrate light emitted from a string of LEDs at a particular distant focal point of direction.

In another aspect, the bow-mounted port (red) and starboard (green) LEDs can be angled to direct the axis of light emission within a span angle of about 112°, each from dead ahead, to provide USCG approved night running lighting. Screens or blinders can be positioned around, above, or to the sides of the LEDs to present light straying from the desired or required emission path.

A further aspect of this invention provides a fishing lighting system which is protected from damage by pontoons, docks, wharves, and moorings.

An additional aspect of the invention is an LED lighting system for a watercraft such as a motorboat or fishing boat which is easily installed or retrofitted into an existing watercraft, consisting of an elongated resilient LED light tube that significantly limits or eliminates damaging of the LED light sources under normal use of the boat, and/or which requires minimal modification and retrofitting of new and existing watercraft for its installation.

An additional aspect of the invention is an LED lighting system that reduced maintenance and repair, and/or that significantly reduces or eliminates the possibility of glare from the light upon the eyes of the boat's occupants, especially at night.

An additional aspect of the invention is an LED lighting system that does not catch or snag upon fishing lines, especially when used at night, and/or which does not require a separate step of mounting when needed.

DETAILED DESCRIPTION OF THE INVENTION

Definitions

As used herein, a watercraft means typically a powered watercraft, such as a motor boat including, but not limited to, an inboard and outboard powered propeller-driven boat or jet boat, including a fishing boat, a recreational boat, a gondola, a houseboat, a speed boat including a ski boat, a patrol boat, a jetski, a swift boat, and a yacht.

Figure 1:
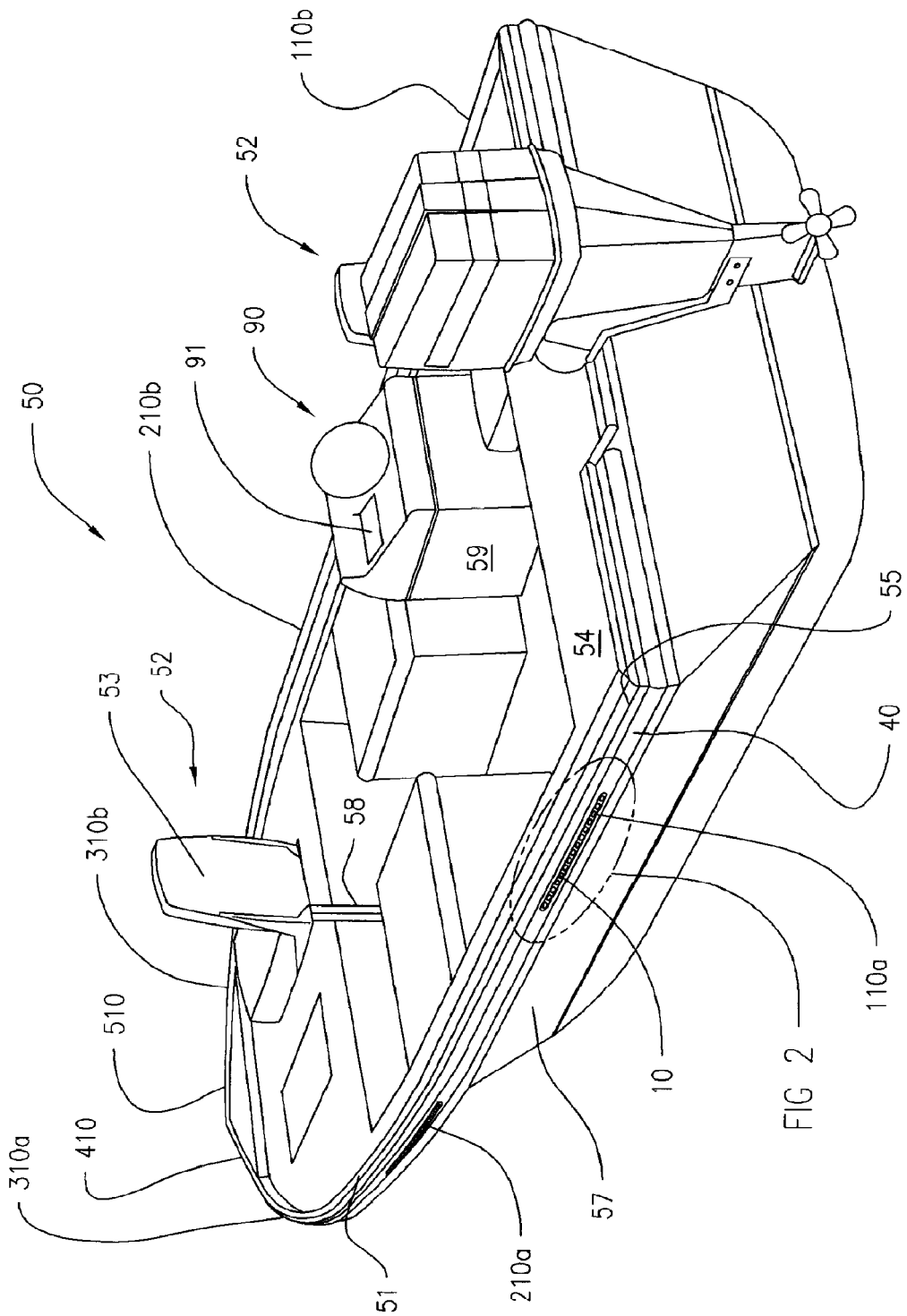
FIG. 1 shows a watercraft having one or more lighting systems of the present invention positioned along the port and starboard sides and near the bow.

Referring now to FIG. 1, a watercraft is shown as a motorized, propeller-driven fishing boat 50 that includes a hull portion 57 and a deck portion 54, deck portion 54 joined to hull portion 57 at a gunwale 51. The opening within the deck portion 54 defines an interior that includes a floor and one or more fishing locations 52 thereupon, fishing locations 52 generally comprising a seat 53 mounted upon a pedestal 58 wherein seat 53 is adapted to rotate about pedestal 58 giving a fisherperson seated upon seat 53 rotatably ready access for fishing in different directions without departing from seat 53. The interior may further have a control console 59 adapted to house the power and navigation controls 90 of boat 50 for moving from one fishing area to another. Control console 59 may have a fishing location 52 associated therewith.

Figure 2:
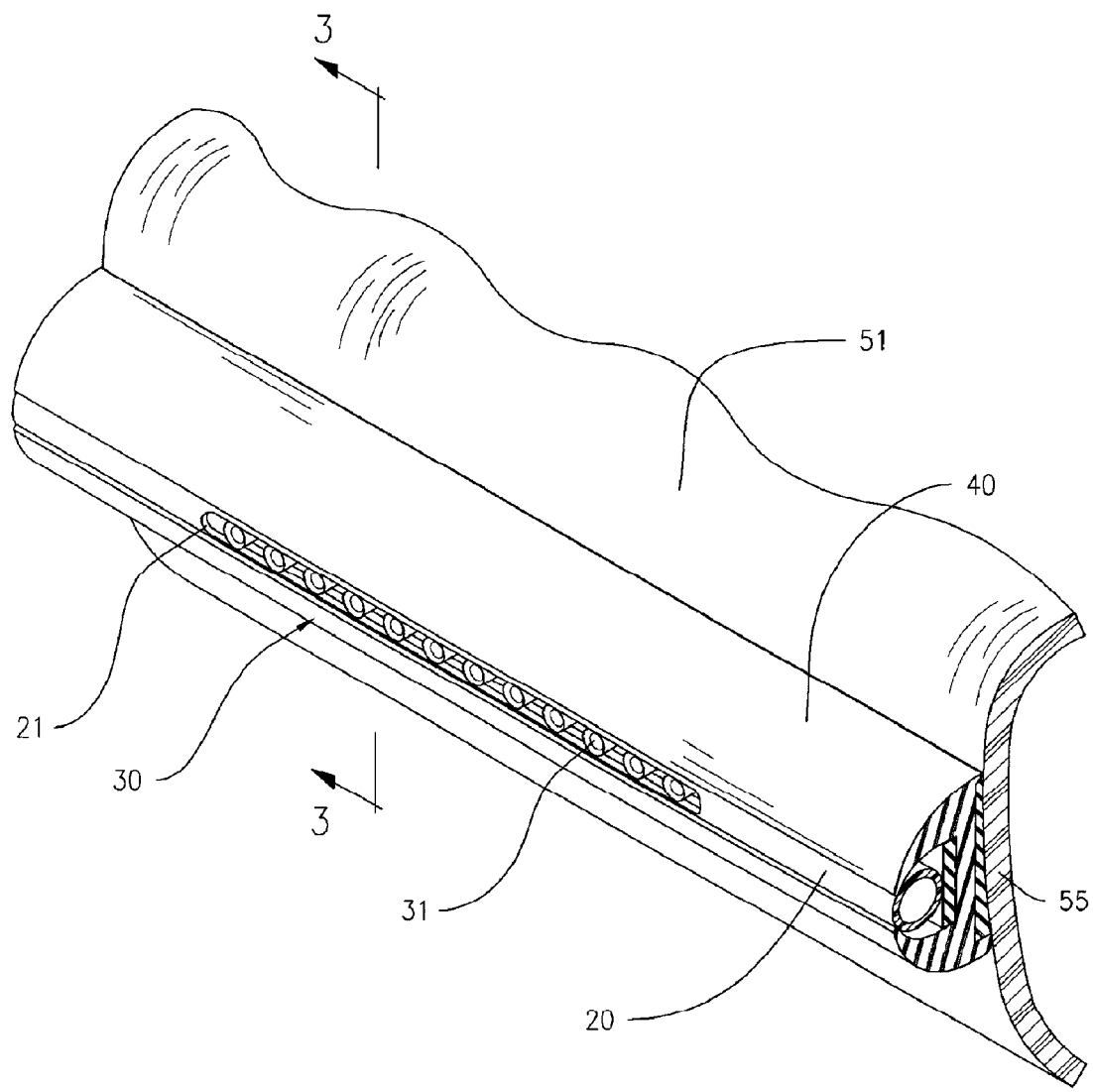
FIG. 2 shows a detailed perspective view of one of the lighting systems of FIG. 1, attached to the gunwale of the watercraft, including a rub rail mounted to the gunwale, and an elongated lighting assembly that includes a string of light emitting diodes.

Gunwale 51 has a gunwale edge 55 having a rub rail 40 strip affixed thereto. The rub rail 40 cooperates with an inserted tubular member 20, shown in FIGS. 2 and 3, to protect the gunwale 51 from damage when docking boat 50 alongside a dock or when placing boat 50 on a trailer for transportation behind a motor vehicle. A spacer strip 60, typically made of an elastomeric material, can be used to fit the rub rail 40 to the sidewall of the hull 57 or the gunwale 51 of the boat 50.

Figure 3:
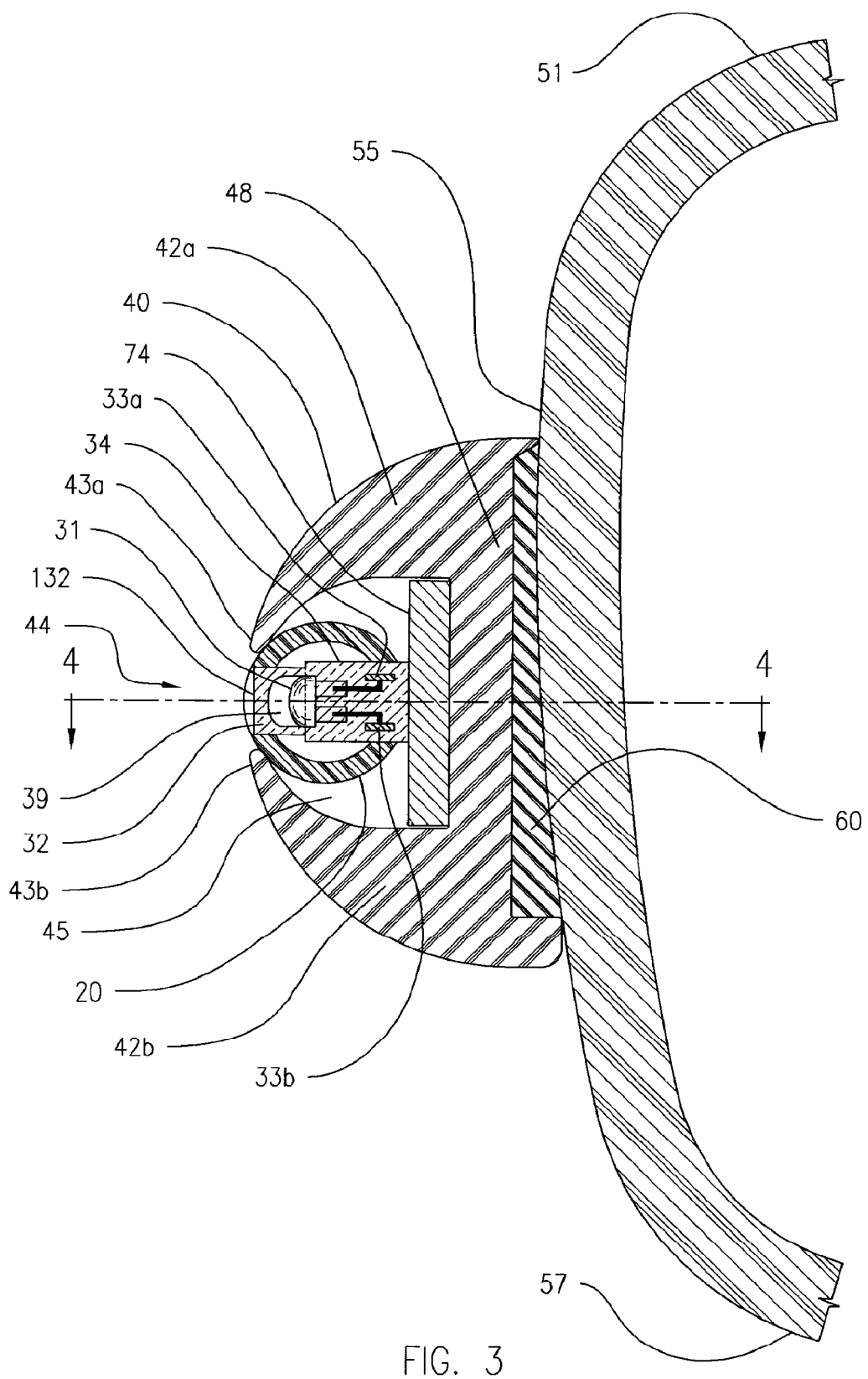
FIG. 3 shows a sectional view of the lighting system as viewed through line 3-3 of FIG. 2.

Rub rail 40 is typically an elastomeric material having resilient properties. The rub rail is an elongated member, and can be a rigid material that allows very little bending, a semi-rigid material with some bending, or a flexible material with easy bending to be formed around the curves in the gunwale or sidewall of the hull. The cross sectional shape of a rub rail 40 is shown in FIG. 3. The rub rail 40 has a base 48 having a first surface for contact with and attachment to the gunwale or other side wall surface of the watercraft. The rub rail 40 also has a pair of opposed, extending arms 42a, 42b that extend outwardly from the base and inwardly toward one another to distal ends 43a and 43b, defining therebetween an elongated opening or gap 44 that communicates with a channel 45 formed between the opposed arms 42a,42b. The cavity 45 has a cross sectional area, laterally and deep, between the pair of opposed arms 42, to retain the tubular member 20. The resilience of the arms 42 allow the distal ends 43 to be temporarily flexibly separated, to increase the width of the opening 44 to accommodate insertion of the tubular member 20, which is typically larger in size (diameter for cylindrical tubes) than the opening 44 to prevent the tubular member 20 from falling out of the channel 45 through the opening.

Figure 8A:
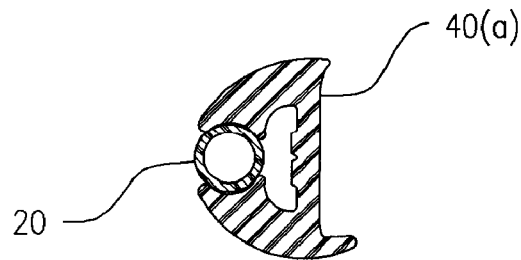
FIGS. 8a-8n show alternative shapes for the rub rail associated with an inserted member, including a tubular member.
Figure 8B:
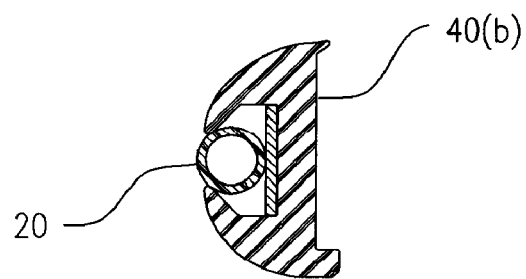
Figure 8C:
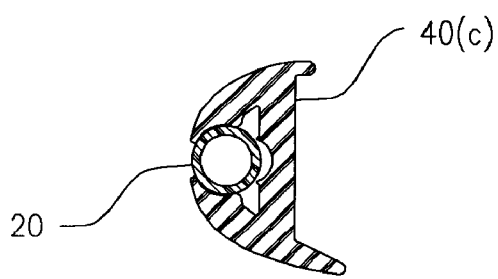
Figure 8D:
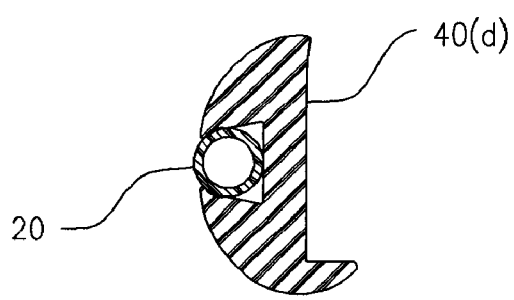
Figure 8E:
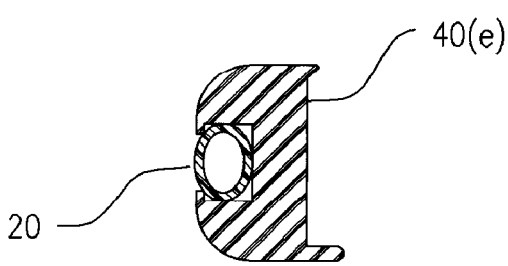
Figure 8F:
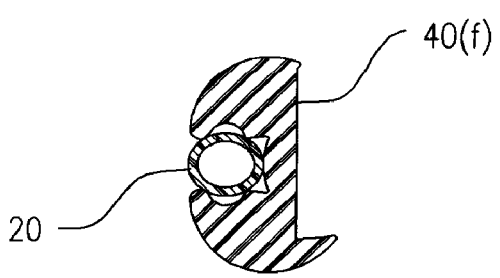
Figure 8G:
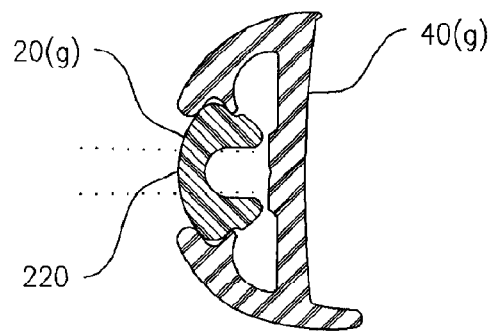
Figure 8H:
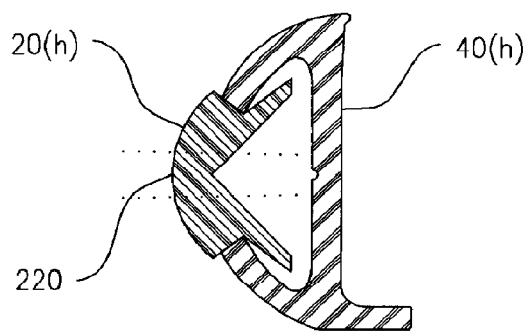
Figure 8I:
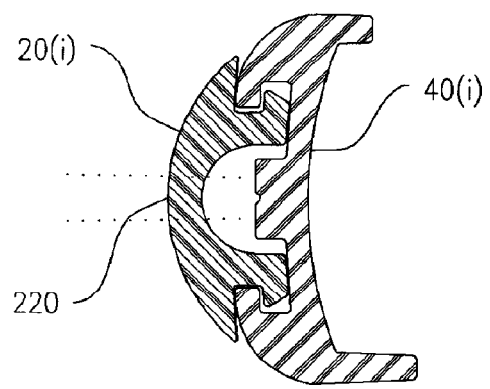
Figure 8J:
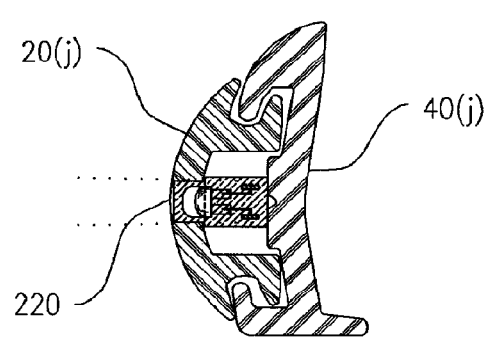
Figure 8K:
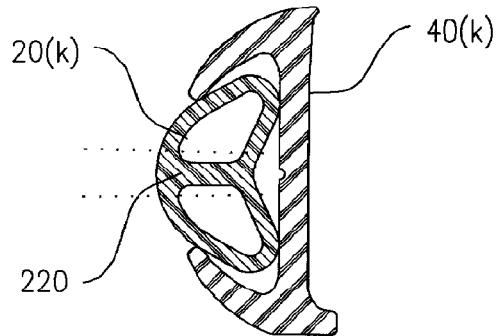
Figure 8L:
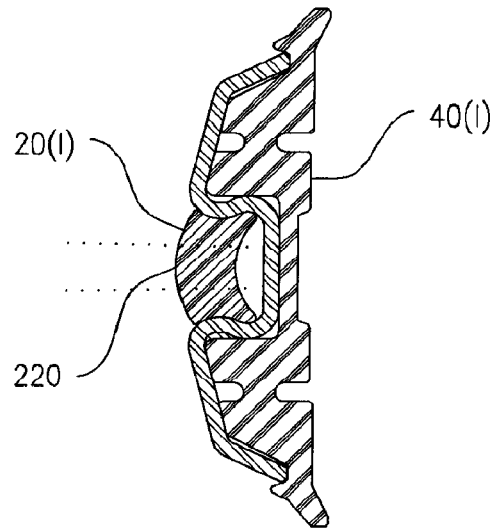
Figure 8M:
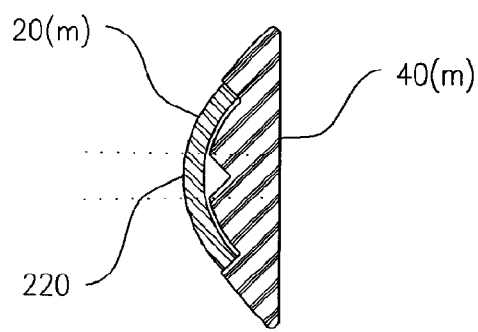
Figure 8N:
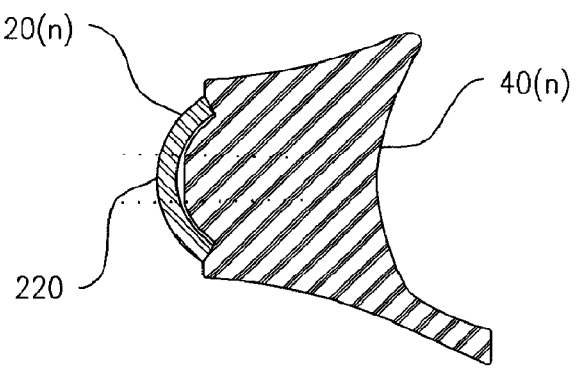

Other non-limiting examples of rub rail cross sectional shapes, associated with inserted members 20, including circular and non-circular tubular members, are shown in FIG. 8a through 8n. Include without limitation are rub rails 40(*a*), 40(*b*), 40(*c*), 40(*d*), 40(*e*) and 40(*f*), each associated with a circular tubular member 20, all available from Taco Metals Inc., North Miami Beach, Fla. The shape of the arms 42 are shown inwardly curved, but can have linear surfaces as well, as shown as 40(*b*), 40(*d*) and 40(*e*).

Figure 4:
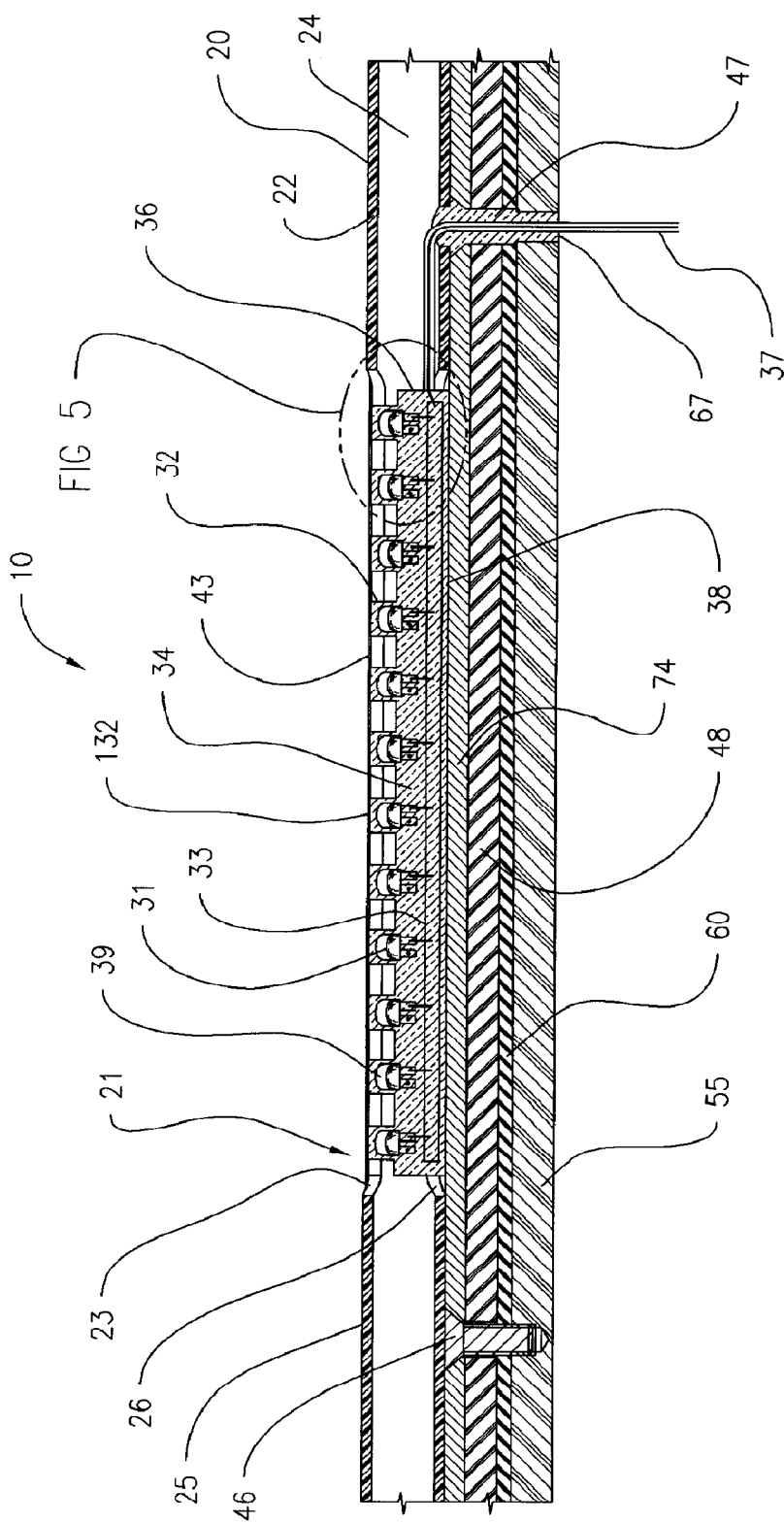
FIG. 4 shows a sectional view along the length of the lighting system as viewed through line 4-4 of FIG. 3.

The rub rail 40 can extend along the full length, substantially horizontally, of each side of the fishing boat 50, from (near) the bow to (near) the stern. The tubular insert usually extends within the channel 45 the full length of the rub rail 40. The rub rail 40 is secured to the gunwale or side wall surface using fastening means, such as with stainless steel screws or bolts 46 (FIG. 4). An optional support strip 74 (FIG. 3), typically a strip of aluminum sheet, can be used to help secure the rub rail to the boat 50.

The elongated lighting assembly 10 is insertable within the cavity 45 of the rub rail 40. The elongated lighting assembly 10 includes a tubular member 20, and a LED light device 30 including a plurality of LEDs 31 spaced along and positioned within the tubular member 20 to emit light through the elongated opening 44 of the elongated rub rail 40.

The tubular member 20 includes a cylindrical tubular wall 22 that can be obtained in various diameters and lengths. Typical tubular member material is commercially known as an insert made of vinyl or other stiff and resilient material, available from Taco Metals Inc., North Miami Beach, Fla. In the illustrated embodiment, as when the tubular member 20 is made of an opaque material or a material having poor light transmission properties, an elongated opening 21 is formed along the length of the outwardly facing surface 25 of the tubular wall 22, which serves as a window for passage of the light emitted by the LEDs 31. The longitudinal sides of the opening 21 can be parallel, straight or curvilinear, and the ends are typically rounded. The portion of the tubular wall 22 is removed with an elongated punch, or by cutting or milling, all by well known means, to form substantially parallel edge surfaces 23 that define the opening 21.

The LED light device 30 is a packaged, encased string of LEDs 31 that are placed and secured within the cavity 24 of the tubular member 20 with the LEDs 31 oriented toward the opening 21. The device 30 includes a series of typically 3-50 LEDs, or more, each LED connected electrically to electrical leads 33a,33b that extend the length of the plurality of LEDs and are connected to a pair of wires 37 that extend from the LED light device 30 as shown in FIG. 4. The wires 37 are typically passed through an opening in the tubular member 20, and routed through an opening 47 in the hull of the watercraft and to the control console 59, where they are connected to power and control elements. The encasing material is a silicone-based elastomer that is resilient, flexible, and transparent, which seals and protects the LEDs 31 and wires 37 to inhibit or prevent their water damage and breakage. The LED light device 30 shown in FIGS. 3 and 4 has a base portion 34 that is rectangular in cross section, encasing the base of the LEDs 31, connecting wiring, and electrical leads 33. The tops of each LED 31 are encased in cylindrical cap portions 32, oriented orthogonally to the longitudinal direction of the string of LEDs, having an air pocket 39 above the top of the LED that allows the cap portions 32 to be pressed inwardly, in response to an outside force, without exerting pressure upon the LED 31. A suitable LED light device is available from oznium.com (www.oznium.com), identified as LED strips, having from 3 up to 48 LEDs, in lengths from 1.2 inches to 19 inches. The LEDs are available in a variety of colors, including red, orange, blue, green and white, and in a variety of wavelengths, including ultraviolet (400-410 nm). (See the oznium.com website.)

FIGS. 3 and 4 show the LED light device 30 associated with the tubular member 20. The cylindrical tubular wall 22 is stamped with an elongated die by well known means to form an elongated opening 21 from the front-facing surface 25 of the tubular member 20. The opening has a length of substantially the same length as the string of LEDs in the LED light device 30, and a width to accommodate the width of the cap portions 32 of the LED light device 30.

To insert the LED light device 30, the back portion of the tubular wall 22 may opened, and optionally a portion removed, such as by cutting or stamping. Typically the back portion is removed to form a rear opening 26, substantially along the length of the LED light assembly, as shown in FIG. 3, to define an access portal for insertion of the LED light device 30, and optionally to make room for the bottom 38 of the LED light device. The wires 37 are fished through the tubular member 20 and passed through an opening in the back portion of the tubular wall.

In an alternative embodiment, the LED light device can be a string of LEDs affixed to a flexible, elongated ribbon of substrate material, also known as flexstrip lighting, typically with the electrical wiring running transverse within the ribbon. Such flexstrip ribbon LEDs are encased in a silicone material, and typically measure about 2 mm thick and about 5 mm wide. An example of a flexstrip LED ribbon light is 3258/5050 SMD, available from a variety of suppliers including Dongguan Cheng Li Optoelectronic Co., Ltd. (China) and Wewon Technology Co., Ltd (China).

Figure 5:
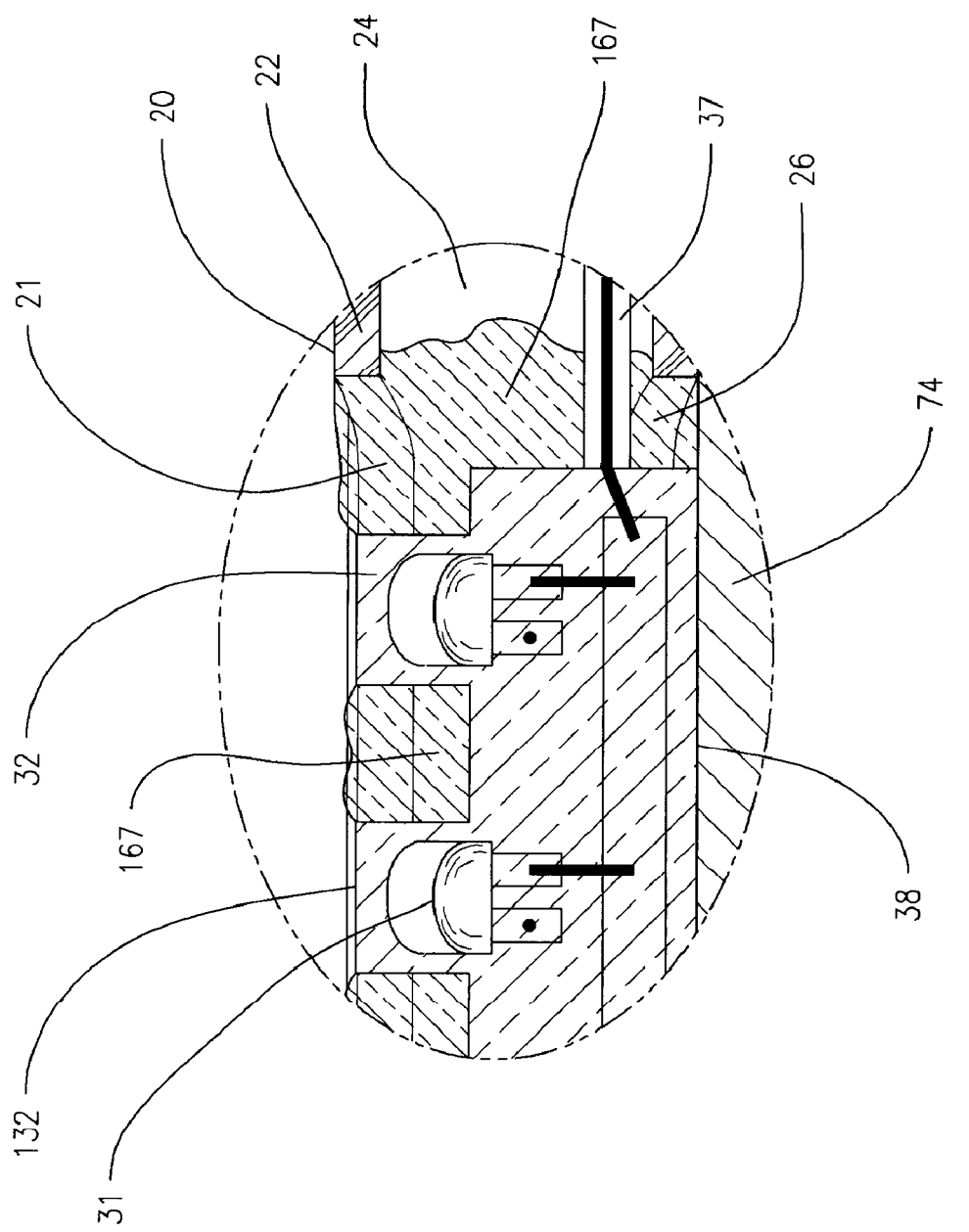
FIG. 5 shows a detailed view of the lighting system of FIG. 4.

In an alternative, optional aspect of the invention, a clear, hardenable silicon material or glue 167, or comparable material can be injected along the length and at the ends of the openings 21 and 26, as shown in FIG. 5, and between and around the wires 37 where they pass through the back portion of the tubular wall 22, to seal and secure the LED light device 30 within the tubular member 20.

Figure 7:
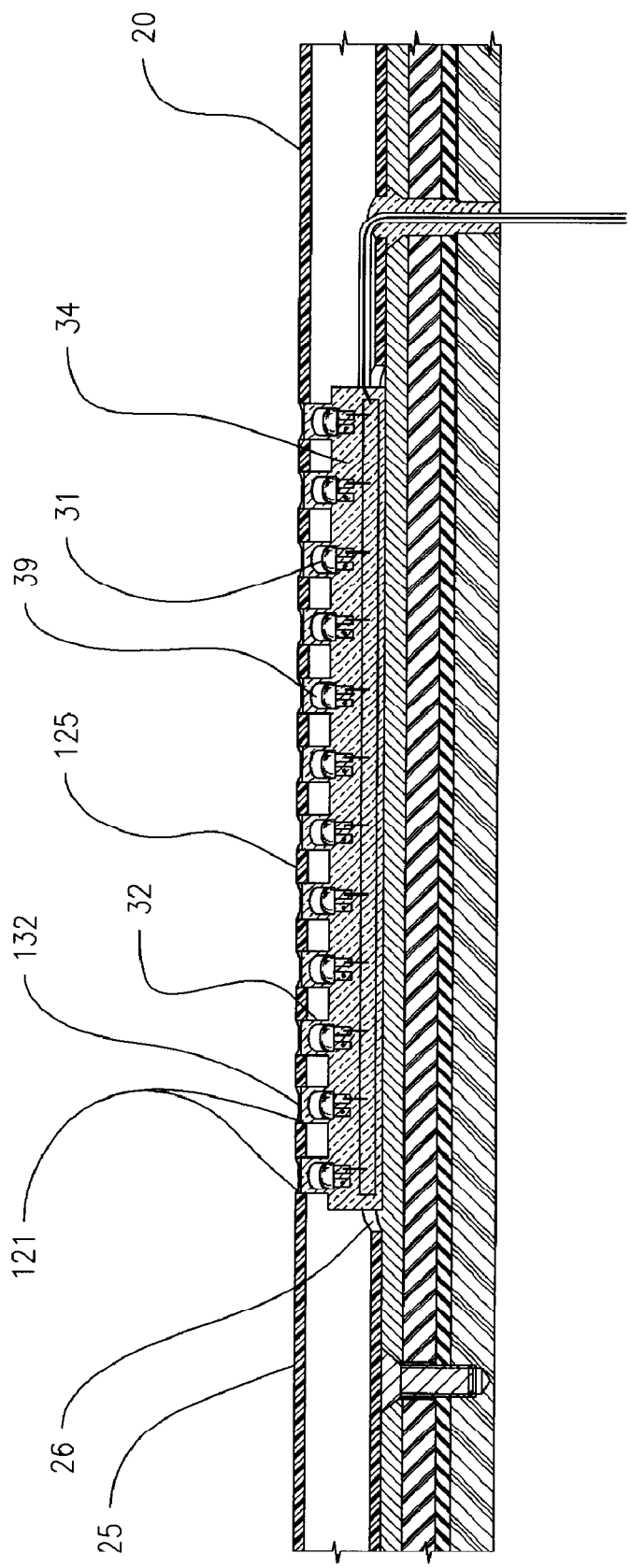
FIG. 7 shows a sectional view of the lighting system as viewed through line 7-7 of FIG. 6.

As shown in FIGS. 3 and 4, and FIG. 7 as well, the end 132 of the cap portion 32 surrounding the LED 31, and the outer edge of the LED light device 30 generally, is recessed within the outside surface 25 of the tubular member 20, and is recessed within the distal ends 43a,43b of the rub rail 40. The LED light device 30 shown in FIG. 4 shows that the LEDs 31 and the extending cap portions 32 have angular annular rims that can be snagged by exogenous objects such as a dock side or other vessel, that can increase the possibility that these exogenous objects can tear off the cap portion 32. In the illustrated embodiment shown in FIG. 5, a clear, hardenable silicon material 167 can be injected into the gaps of the opening 21 around the LED light device 30, into the cavity 24 of the tubular member 20 near the ends 35 of the LED light device 30, and into the spaces and filling the spaces between the cap portions 32 to eliminate the angular rims.

In another embodiment, the cap portions 32, shown with a rectangular end 132 in cross section, can instead have a rounded end in cross section. In another alternative embodiment, an elongated unitary cap portion can extend over the plurality of LEDs leaving no spaces or gaps between the LEDs.

In an alternative embodiment, the LED light device 30 can be sized or modified for insertion through an end of the tubular member 20, and sealed and secured in position.

In an installation of the tubular member, a roll of manufactured tubular insert material 20 with the pre-installed LED light assemblies 30 can be pressed into and through the opening 44 and into the channel 45 of the rub rail 40, while snaking the wiring 37 through the openings 47 in the wall of the end 55 of the gunwale.

Figure 6:
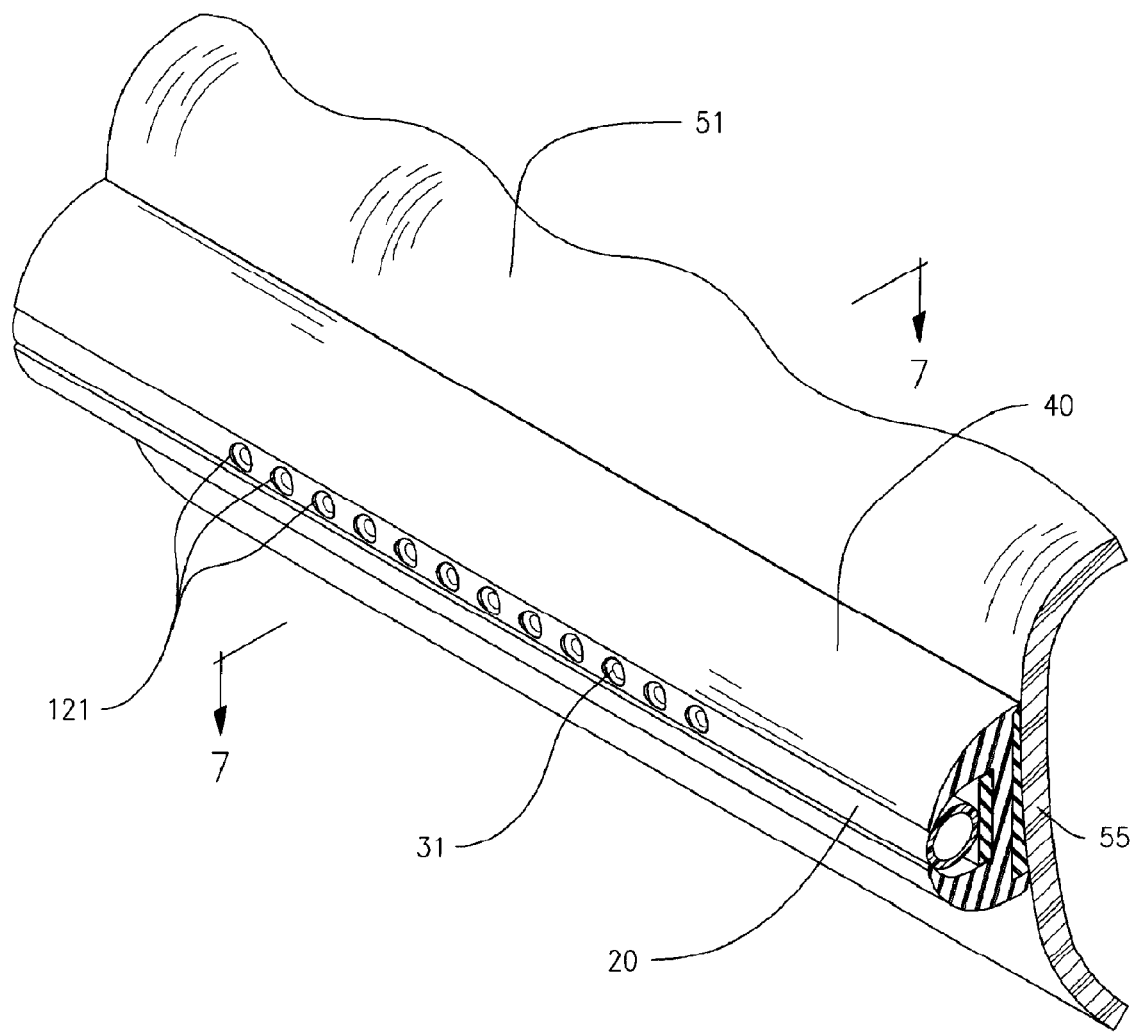
FIG. 6 shows a sectioned perspective of a second embodiment of the lighting system.

In another alternative embodiment, the plurality of light emitting diodes (LEDs) 31 are spaced along and positioned within the tubular member 20 and emit light through a corresponding plurality of individual openings 121 formed in the tubular member 20, as shown in FIGS. 6 and 7. The individual openings 121 are spaced apart along the length of the tubular member 20 in substantial registry with the spacing of the plurality of LEDs 31 of the LED light device 30, so that the emitted light passes through the openings 121. The openings 121 can be formed in the outer surface 25 by boring or die punching, or other well known means, with a diameter or size sufficient to pass the emitted light. The diameter or size can be smaller than the LED 31 or protective covering 32 thereover, or can be the same size or larger. In FIG. 7, the openings 121 have a diameter of slightly more than the diameter of the cap portion 32 surrounding the LED 31, to provide a snug and secure fit of the end 132 of the cap portions 32 within the opening 121. The remaining portions 125 of the tubular wall 22 between the adjacent individual openings 121 add to the strength and resilience of the LED light assembly 10.

The individual openings 121 can be molded into or later formed into the tubular member by means including rotary or indexed punching, lasering, and drilling during manufacture, or by retrofit.

The LED lighting assembly 10 is connected to an electrical power source and operation controls by well known means, such as those described in U.S. Pat. No. 7,291,852, the disclosure of which is incorporated herein by reference. The connecting wires 37 from the LED light assemblies 10 are passed through the opening(s) 47, usually small holes, in the gunwale or wall of the hull 57, and along the inside of the hull or deck 54 to a source of power and to the controls 91. The sources of power can be a marine battery, and the controls can include separate or integrated switches, variable rheostats to vary the amount of power to the LEDs 31 and hence the intensity of the light emitted. As the present invention includes one or more LED light assemblies 10 positioned along either side of watercraft, and fore and aft, the power wires 37 can be routed through the lengths of the tubular member 20 to a single hole or opening 47, or through respective separate holes.

The rub rail 40 and the tubular member 20 can comprise a natural or synthetic rubber or a thermoplastic material, including polycarbonate, polypropylene, polyethylene, polyvinyl chloride, vinyl, polyamide, polyparabenzamide, fiberglass, polytetrafluoroethylene, polystyrene, epoxy, acrylic, vinyl ester, methylmethacrylate, isophthalic polyester, terephthalic polyester, orthophthalic polyester, dicyclopentadiene, urethane and silicone or blends or laminates of the above, however, other materials may also be utilized. A substantially rigid thermoplastic material such as polycarbonate is preferred for its high impact resistance to forces present in docking a boat. Polycarbonate is also substantially clear though colorants may easily be mixed therein to provide for an opaque material.

In alternative embodiments of the invention, the tubular member 20 can be a transparent material, such as polycarbonate. In such embodiments, there is no essential need for an opening 21 or openings 121 in the outer surface 25 for passage of the emitted light from the LEDs.

In other embodiments of the invention, a plurality of LED light assemblies 10 can be used on a watercraft. As shown in FIG. 1, one or a pair of first LED light assemblies 110a, 110b can be installed along the port and/or starboard sides, near the middle or toward stern, which include a plurality of UV LEDs. An additional one or a pair of second LED light assemblies 210a, 210b can be installed along the port and/or starboard sides, more forward to the bow, that includes a plurality of UV LEDs. One or a pair of third LED light assemblies 310a, 310b can be installed along the port and/or starboard sides, close to the bow, that includes a plurality of white-light LEDs. Another LED light assembly 410 can be installed at the bow on the port side that includes a plurality of red-light LEDs, to serve as a red port running light. Another LED light assembly 510 can be installed at the bow on the starboard side that includes a plurality of green-light LEDs, to serve as a green starboard running light.

In another aspect, the bow-mounted port (red) and starboard (green) LEDs can be angled to direct the axis of light emission within a span angle of about 112°, for example 112.5°, each from dead ahead, to provide USCG approved night running lighting. Screens or blinders can be positioned around, above, or to the sides of the LEDs to present light straying from the desired or required emission path.

Figure 10:
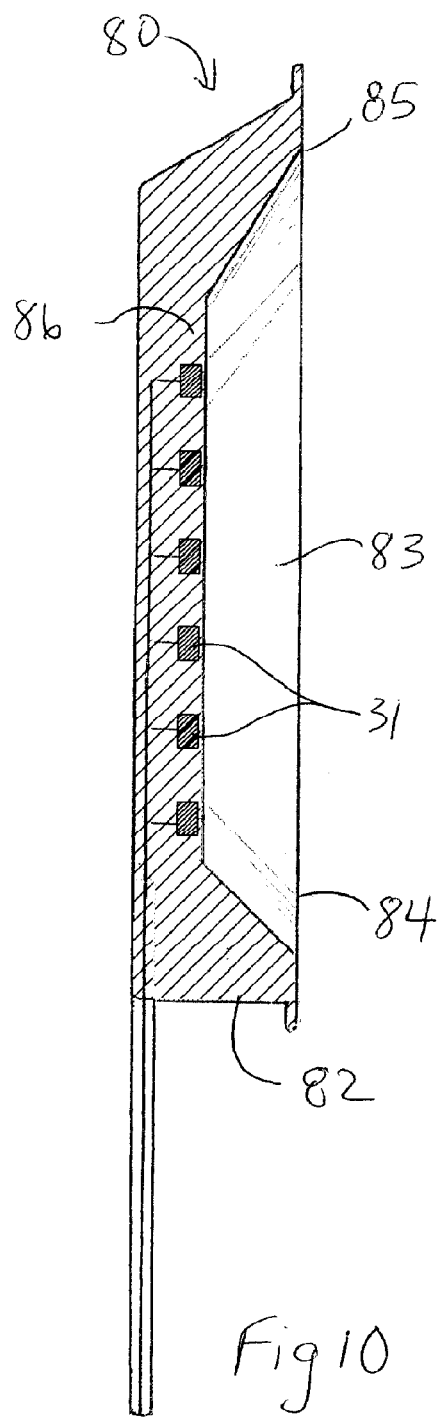
FIG. 10 shows a sectional view along the elongated lighting device of FIG. 9 as viewed through line 10-10.
Figure 9:
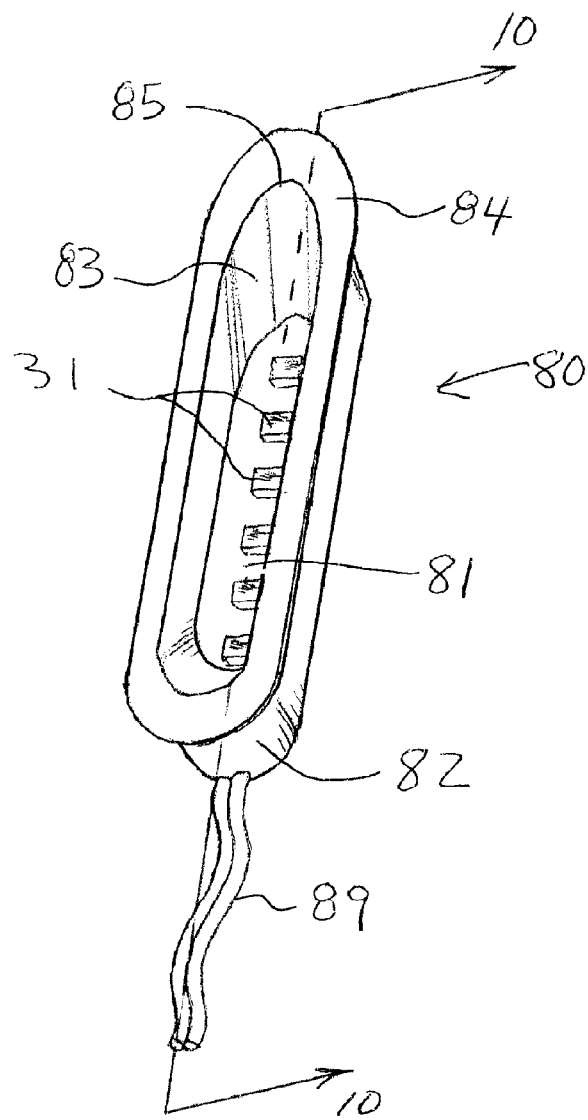
FIG. 9 shows an alternative embodiment of the elongated lighting device.

FIGS. 9 and 10 show an alternative embodiment of an elongated lighting device 80 that can be mounted within a suitably-sized cavity within an insert or a rub rail, such as within the cavity 45 of the rub rail 40 of FIG. 3. The elongated lighting device 80 includes an elongated string 81 of LEDs 31, including a flexible ribbon of LEDs, secured to an insertable body 82. The elongated LED string 81 can be in-molded into, adhesively attached to, or mechanically secured within, the insertable body 82. The electrical wiring 89 connects the string of LEDs 31 to a remote voltage source. The insertable body 82 is typically a molded plastic piece, having a base portion 86 and a top surface 84 joined around the periphery of the base portion by a sidewall 83. The depth of the LEDs 31 affixed to or within the base portion 86, below the top surface 84, and the slope of the sidewall 83, cut down the angle of the light emitted outwardly and laterally by the string of LEDs, including over the leading edge 85 of the rim of the sidewall 83. The base portion, with the string of LEDs secured, is substantially planar or flat, and can be parallel with, or configured with a slight angle to, the top surface 84.

The elongated lighting devices 80 are useful as a port and starboard running light, described above, when outfitted with LEDs of the appropriate chromaticity. The base portion 86 and sidewalls of the device 80 are inserted through the cavity in the rub rail, with the leading edge 85 oriented toward the bow of the vessel. The top surface 84 serves as a flange against the rim that defines the cavity, to position the device 80 in the appropriate position within the rub rail. The elongated lighting device 80 is then positioned along the rub rail near the bow at the appropriate position and orientation, relative to dead ahead, to provide the required navigational lights specifications for the port and starboard running lights.

Any one or any combination of the above LED light assemblies, and additional LED light assemblies 10, can be installed onto a water craft. As one of ordinary skill can appreciate, the desired strings of LED lights can be separately pre-assembled into tubular members to form separate LED light assemblies, and separately installed in the rub rail. Alternatively some or all of the desired strings of LED lights can be pre-assembled into a single tubular member to form several LED light assemblies within a unitary length of tubular member to form a composite, all-in-one LED light assembly 10 that is installed into the cavity of the rub rail.

In another embodiment of the invention, the encased string of LEDs can be manufactured into a flexible cylindrical length that has positioned along the length the desired one or more LEDs of the desired color or wavelength output. This embodiment can then be inserted directly into the cavity of the rub rail 40, without the need for the separate tubular member 20.

In alternative embodiments, the combination of rub rail 40 and inserted member 20 can have other complementary shapes that provide or can be configured to provide, a channel within which the LED light system 30 can be installed, including without limitation, those shown in FIGS. 8g though 8o as combinations rub rail 40(g) and inserted member 20(g), rub rail 40(h) and inserted member 20(h), rub rail 40(i) and inserted member 20(i), and rub rail 40(j) and inserted member 20(j), all available from Taco Metals Inc., North Miami Beach, Fla., as well as combinations rub rail 40(k) and inserted, tubular member 20(k), rub rail 40(l) and inserted member 20(l), rub rail 40(m) and inserted member 20(m), rub rail 40(n) and inserted member 20(n), and rub rail 40(o) and inserted member 20(o). The portion 220 (generally defined between the dotted lines) of an inserted member 20 can be opened with an elongated opening(s) or a plurality of individual openings as described herein to accommodate the LEDs and light emitted by the LEDs. FIG. 8j, by example, shows the cross section of a modified inserted member 20j that is configured, by removal of material along the length of the inserted member in the portion 220, either partially or completely through the thickness of portion 220, to accommodate the placement of the string of LEDs. In other embodiments, the rub rail 40 can be modified by removal of material along its length, generally in portion 220, as well as through the inserted member 20, to accommodate the placement of the string of LEDs.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. A lighting system for watercraft, including:
   a) an elongated rub rail having a base having an inner surface for attachment to a gunwale or side wall surface of a watercraft, and a pair of opposed retaining arms extending from an outer portion or portions of the base, each arm having a distal end wherein the distal ends are spaced apart to define an elongated opening communicating with an elongated cavity formed between the arms, and
   b) an elongated lighting assembly securable within the elongated cavity of the elongated rub rail, the elongated lighting assembly including;
   an elongated tubular member having a cylindrical wall made of an opaque material, and having a plurality of spaced-apart, longitudinally-aligned circular bore openings radially through the tubular wall, wherein the longitudinally-aligned bores register with the elongated opening of the rub rail, and
   a plurality of light emitting diodes (LEDs), each LED being encased in a cylindrical cap through which the light is emitted, wherein an end portion of the cylindrical cap of the LED is positioned within one of the bore openings through the tubular wall, to emit light through the bore in the tubular wall and the elongated opening of the elongated rub rail.

2. The lighting system according to claim 1 wherein the LEDs are ultraviolet- (UV-) emitting LEDs.

3. The lighting system according to claim 1 wherein a back of the cylindrical tubular wall has an elongated opening in through which the plurality of LEDs are inserted into the tubular member.

4. A lighting system for watercraft, including:
   a) an elongated rub rail having a base having an inner surface for attachment to a gunwale or side wall surface of a watercraft, and a pair of opposed retaining arms extending from an outer portion or portions of the base, each arm having a distal end wherein the distal ends are spaced apart to define an elongated opening communicating with an elongated cavity formed between the arms, b) an elongated inserted member disposed within the elongated cavity of the rub rail, the inserted member being made of an opaque material, having an outer surface disposed in the elongated opening of the rub rail, and having a plurality of spaced-apart, longitudinally-aligned circular bore openings formed radially through the outer surface of the tubular wall, and c) a plurality of light emitting diodes (LEDs), each LED being encased in a cylindrical cap through which the light is emitted, wherein an end portion of the cylindrical cap of the LED is positioned within one of the bore openings through the tubular wall, to emit light through the bore in the outer surface of the inserted member.

5. The lighting system according to claim 4 wherein the plurality of LEDs are ultraviolet- (UV-) emitting LEDs.

* * * * *